US008870397B2

(12) United States Patent
Herrmann et al.

(10) Patent No.: US 8,870,397 B2
(45) Date of Patent: Oct. 28, 2014

(54) SEAL AND EXTERIOR REAR VIEW MIRROR ASSEMBLY

(75) Inventors: Andreas Herrmann, Winnenden-Baach (DE); Istvan Szmolenszki, Schwaikheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 67 days.

(21) Appl. No.: 13/197,123

(22) Filed: Aug. 3, 2011

(65) Prior Publication Data
US 2012/0033313 A1    Feb. 9, 2012

(30) Foreign Application Priority Data

Aug. 3, 2010  (EP) .................................... 10171723

(51) Int. Cl.
G02B 7/18      (2006.01)
B60R 1/06      (2006.01)

(52) U.S. Cl.
CPC ........................................ B60R 1/06 (2013.01)
USPC ........................................................ 359/841

(58) Field of Classification Search
USPC ................. 359/838, 841–844, 846–849, 865, 359/871–881
See application file for complete search history.

(56) References Cited

U.S. PATENT DOCUMENTS 4,247,173 A * 1/1981 Vitaloni ......................... 359/841
4,936,537 A   6/1990 Namba et al.
5,339,192 A * 8/1994 Cho ............................... 359/841
5,889,624 A   3/1999 Dickenson
6,260,977 B1 * 7/2001 Inagaki ......................... 359/879

FOREIGN PATENT DOCUMENTS

DE      19954082      5/2000
JP      2001233126    8/2001

OTHER PUBLICATIONS

Merriam-Webster's Collegiate Dictionary 106 (11th ed. 2003).*
European Search Report for application No. EP 10 17 1723 dated Jan. 18, 2011.

* cited by examiner

Primary Examiner — Stephone B Allen
Assistant Examiner — James McGee
(74) Attorney, Agent, or Firm — Reising Ethington P.C.

(57) ABSTRACT

A seal of a part of an exterior rear view mirror assembly relative to a body part of a motor vehicle is described, which seal is provided for covering at least one section of a surface of a mirror base and/or a mirror base cover, which takes its bearing on the bodywork side. The seal is securely connected to the mirror base and/or mirror base cover by means of at least one connecting link. The at least one connecting link forms a hinge-like articulated connection. The hinge-like articulated connection includes at least one hinge joint axis running adjacently to the at least one surface, which takes its bearing on the bodywork side. The seal can preferably be folded about the at least one hinge-joint axis onto the section, which is at least to be covered, of the at least one surface, which takes its bearing on the bodywork side.

10 Claims, 3 Drawing Sheets

US 8,870,397 B2

SEAL AND EXTERIOR REAR VIEW MIRROR ASSEMBLY

The invention is based on a priority patent application EP 10171723.9 which is hereby incorporated by reference.

BACKGROUND ART

1. Field of the Invention

The invention relates to a seal of an exterior rear view mirror assembly, relative to the bodywork or a body part of a motor vehicle which seal is provided for covering at least one section of a surface of a mirror base and/or a mirror base cover, which takes its bearing on the bodywork side, wherein the seal being securely connected to the mirror base and/or the mirror base cover by means of at least one connecting link, whereby the at least one connecting link forms at least one hinge-like articulated connection including the hinge-joint axis running adjacently to the at least one surface, which takes its bearing on the bodywork side, and whereby the seal can be folded about the at least one hinge-joint axis onto the section, which is at least to be covered, of the at least one surface, which takes its bearing on the bodywork side.

2. Description of the Related Art

An exterior rear view mirror assembly for a motor vehicle consists, for example, of a mirror base arranged on the motor vehicle, which can be covered by means of a mirror base cover, and an exterior rear view mirror arranged on the mirror base. The exterior rear view mirror includes an exterior rear view mirror housing, which, inter alia, houses the base bracket assigned to the mirror base.

The mirror base and the base bracket are hinged together, so that the exterior rear view mirror can be pivoted about a hinge axis in relation to the mirror base from an operating position to a folding point and vice versa. The mirror base and base bracket can be produced from die-casting material, for example, from the same material.

An adjusting device for a mirror glass, driven by an electric motor, for example, is arranged on the base bracket. The adjusting device acts on a backing plate, on which the mirror glass is arranged. The mirror glass can be mounted onto the backing plate by means of an adhesive connection. The backing plate can be guided to and/or mounted on the adjustment device and/or the base plate. The term 'backing plate' here refers to any type of bracket, which comprises at least one bracket surface, with a plane or vaulted design, closed or in a non-continuous grid, for example, honeycombed, on which it is suitable to attach a mirror glass, for example by means of an adhesive connection or by clipping e.g. locking means, protruding behind the perimeter of the bracket surface and arcing inwards towards the centre of the bracket surface, seen from the perimeter.

On its rear side, facing away from the direction of movement of the vehicle in the operating position, the exterior rear view mirror housing comprises an opening, through which the mirror glass is visible, or in which the mirror glass is arranged. In order to ensure that the mirror glass is adjustable, a distance is kept on all sides between the mirror glass or backing plate and the walls of the exterior rear view mirror housing surrounding the opening, so that a gap is given around the mirror glass between the walls of the exterior rear view mirror housing surrounding the opening.

In addition to or in place of a mirror glass, which is adjustable by an electric motor, the exterior rear view mirror can house one or several additional electrical components. Examples of electrical components of this type are:
a turn signal indicator
an entry light
a heatable mirror glass,
an electro-chromatically dimmable mirror glass,
a detection module and/or warning display module for a driving assistance device, such as blind spot monitoring, a lane departure warning, approach monitoring, or similar
a sensor for detecting driving and/or surrounding conditions, such as for example, temperature, brightness, degree of pollution, lighting situation, for example, in order to automatically heat the mirror glass, or to dim electro-chromatically, for example.

In addition, the exterior rear view mirror can comprise one or several combinations of the electrical components given as examples.

The electrical components in the exterior rear view mirror are connected to a power supply on the vehicle side, and/or to a control device on the vehicle side, for example, by means of an electrical connection through the mirror base, for example by a vehicle electrical system and/or a bus system. The electrical connection consists, for example, of a cable harness with several cables, if necessary, each with separate plug connections to the electrical terminal of the electrical components, in each case individually or in groups, and at least one electrical plug connection for continuative electrical contacting on the vehicle side.

In order to satisfy high demands of quality in the automotive industry, it is known to close or shut off and/or seal cavities in the bodywork or in body parts or in portions of the bodywork or of body parts, for example, in order to avoid the entry of dirt and/or moisture. It is also known, for example, to close openings provided for feed-through of a cable harness in the bodywork or in body parts, so that no undesired dirt and/or moisture can enter through these openings.

It can therefore be intended to seal the mirror base, as well as the mirror base covering, against the vehicle when mounting an exterior rear view mirror assembly onto bodywork or a body part of a vehicle. For this, it is known to provide at least one section of the surface of the mirror base, lying on the bodywork side, with at least one matt-type underlay, also denoted as a sealing pad. The sealing pad can consist of a foamed material. The section of the surface of the mirror base lying on the bodywork side is, for example, a surface portion situated around the exit of the cable harness from the mirror base on the vehicle side.

In order to avoid scratching the bodywork or a body part during installation of an exterior rear view mirror assembly, for example, it can be intended, alternatively or additionally, to supply at least the surface of the mirror base and/or the mirror base cover lying on the bodywork side with a rubbery, elastic underlay, for example, which remains between the bodywork or the body part and the mirror base and/or the mirror base cover, in a fully assembled state. An underlay serving for this described purpose is also hereafter denoted as a seal.

The disadvantage of the known prior art is that a seal serving for the above purpose, covering at least one section of a surface of the mirror base and/or mirror base cover taking its bearing on the bodywork side, can be lost or forgotten before or during the installation of an exterior rear view mirror assembly on bodywork or a body part of a motor vehicle.

Additionally, there is the risk that the seal, in arrangement on the at least one section of the surface taking its bearing on the bodywork side, for example, is mounted wrongly or incorrectly in relation to a true-sided and correctly rotated location, as well as position.

SUMMARY OF THE INVENTION

An object of the invention is to create an improved seal of an exterior rear view mirror assembly relative to a body part of a motor vehicle, which seal covers at least one section of a surface of a mirror base and/or a mirror base cover, which takes its bearing on the bodywork side.

The object is achieved by an exterior rear view mirror assembly with a mirror base and/or a mirror base cover, with a seal of a part of an exterior rear view mirror assembly relative to a body part of a motor vehicle, which seal is provided for covering at least one section of a surface of a mirror base and/or a mirror base cover, which takes its bearing on the bodywork side, wherein the seal being securely connected to the mirror base and/or the mirror base cover by means of at least one connecting link, whereby the at least one connecting link forms at least one hinge-like articulated connection including the hinge joint axis running adjacently to the at least one surface, which takes its bearing on the bodywork side, and whereby the seal can be folded about the at least one hinge-joint axis onto the section, which is at least to be covered, of the at least one surface, which takes its bearing on the bodywork side.

A first item of the invention accordingly concerns a seal of a part of an exterior rear view mirror assembly relative to a body part of a motor vehicle. The seal is provided for covering at least one section of at least one surface of a mirror base and/or mirror base cover, which takes its bearing on the bodywork side. When the exterior rear view mirror is fully assembled on the motor vehicle, the seal is located between the body part of the motor vehicle and the mirror base and/or the mirror base cover of the exterior rear view mirror assembly. The term 'body part' here refers to both the bodywork of a vehicle as a whole, as well as all parts forming the bodywork of a vehicle, such as perhaps doors, bonnets, covers, chassis etc. themselves, as well as portions or sections of the body work or its parts.

The seal is securely connected to the mirror base and/or mirror base cover by means of at least one connecting link. In the process, even when the exterior rear view mirror assembly is not yet mounted onto the motor vehicle, the seal is securely connected to the mirror base and/or the mirror base cover, by means of at least one connecting link, before it is mounted, if necessary, with a mirror base covered by a mirror base cover onto the motor vehicle on the bodywork side.

The at least one connecting link forms a hinge-like articulated connection between the seal and the mirror base or the mirror base cover, or between the seal and the mirror base and the mirror base cover. The articulated connection includes at least one hinge joint axis running adjacently to the surface taking its bearing on the bodywork side, for example, on its edge, or on the outside. The seal is preferably foldable in the correct location and the exact position about the at least one hinge-joint axis onto the section, which is at least to be covered, of the at least one surface taking its bearing on the bodywork side.

Ideally, in this process, the at least one connecting link exactly forms a defined hinge-joint axis in its position and orientation relative to the at least one surface taking its bearing on the bodywork side. However, for tolerance compensation, it is expedient to design the connecting link in such a way that it achieves a group of hinge-joint axes, whereby, inter alia, different motion sequences are also made possible during installation, in order to fold the seal onto the section, to be covered, of the least one surface taking its bearing on the bodywork side. In the process, each hinge-joint axis of the group can take different positions and/or orientations, for example, inside through the borders given by the at least one connecting link, in relation to the at least one surface, which takes its bearing on the body side. Through this, the assembly process can be made considerably easier, particularly in relation to tolerances lying within certain limits.

The at least one connecting link thus forms a hinge-like joint, about which the seal is foldable about the at least one hinge-joint axis running at the edge, for example, or outside of the at least one surface lying on the bodywork side, at least onto the section to be covered of the at least one surface lying on the bodywork side.

The seal preferably consists of an elastic material or material mix. The term 'material mix' here includes both homogenous, and inhomogeneous material mixtures and material combinations, as well as, fibre-reinforced materials, for example, at least in sections, e.g. in the region of the seal and/or the at least one connecting link.

Preferably, the seal and the at least one connecting link are produced from the same material or material mix. The material or material mix can be foamed, at least in the region of the seal.

The invention is suitable for both exterior rear view mirror assemblies mounted onto the door sill, as well as for those mounted in a mirror triangle.

The at least one connecting link in this process defines at least one hinge-joint axis, about which the seal can be folded onto the at least one surface taking its bearing on the bodywork side. In the process, the at least one connecting link can have a design which is long enough, so that when the seal is folded at least on the section, which is at least to be covered, of the at least one surface taking its bearing on the bodywork side, when the part of the exterior rear view mirror assembly is mounted onto the body part, it does not protrude, or at least not markedly or not in an interfering manner, over the exterior contour of the mirror base cover within the at least one surface, which takes its bearing on the body part.

An advantageous configuration of the invention intends that the seal is securely connected to the mirror base cover by means of the at least one connecting link. The mirror base cover and seal can be produced as one piece, for example, in a two-component or multi-component injection moulding process. Advantages of the invention in relation to prior result from this, as only one tool is necessary for production of the mirror base cover and the seal. Since each production line only has a finite number of injection moulding machines, this represents a considerable improvement in productivity, in connection with considerable cost savings in production. Assembly is also made easier by the overmoulding of the seal on the mirror base cover, since, on one hand, the seal connected to the mirror base cover by means of the at least one connecting link can no longer be lost, and on the other hand, for production of a securing device, the seal must not be attached in a work process specifically provided for this by means of a connecting link on the mirror base cover and/or on the mirror base.

It is important to emphasise that the one or several connecting links, which connect the seal and the mirror base cover and/or the mirror base together, are integral on the seal, and preferably are also integrally moulded on the mirror base cover and/or mirror base.

It can be seen that the invention can be implemented by a mirror base cover, on which a seal, provided for covering at least one section of a surface of a mirror base and/or mirror base cover which takes its bearing on the bodywork side, made of an elastic material or material mix, is securely attached by means of at least one connecting link, preferably as one piece by overmoulding.

Alternatively, the invention permits an implementation through a mirror base, on which a seal, consisting of an elastic material or material mix, which is provided for covering at least one section of a surface of a mirror base and/or mirror base cover which takes its bearing on the bodywork side, is securely attached by means of at least one connecting link. The attachment can also be produced by overmoulding here, insofar as the mirror base consists of a material suitable for this.

Advantages of the invention in relation to the prior art result from, inter alia, the connecting link connecting the seal to the mirror base cover and/or mirror base forming a securing device for the seal in handling before and during the installation of an exterior rear view mirror assembly e.g. during the assembly or during its arrangement on a motor vehicle.

Further advantages of the invention in relation to the prior art are given in that in a corresponding configuration of a connecting link, e.g. an anti-twist device is given by a configuration extending relatively along the hinge joint axis, similar to an integral hinge, or by using two or several connecting links. When the seal is folded onto at the section, which is at least to be covered, of the surface taking its bearing on the bodywork side, the anti-twist device prevents incorrect arrangement in terms of location, position, orientation and alignment of the seal on the surface taking its bearing on the body work side. This advantage of the invention can be particularly seen in relation to the prior art, in which there was often an incorrect arrangement in terms of location, position, orientation and alignment, or the seal was forgotten or omitted during installation.

A second item of the invention relates to an exterior rear view mirror assembly for a motor vehicle, with a previously described seal, which is securely connected to a mirror base and/or a mirror base cover by means of a connecting link.

BRIEF DESCRIPTION OF THE DRAWINGS

Further features of the invention result from the claims, description and drawings.

Execution examples of the invention are subsequently explained in more detail by means of the drawings. Identical reference characters denote identical or identically acting elements. In the drawings, shown schematically.

DETAILED DESCRIPTION OF THE DRAWINGS

Figure 1:
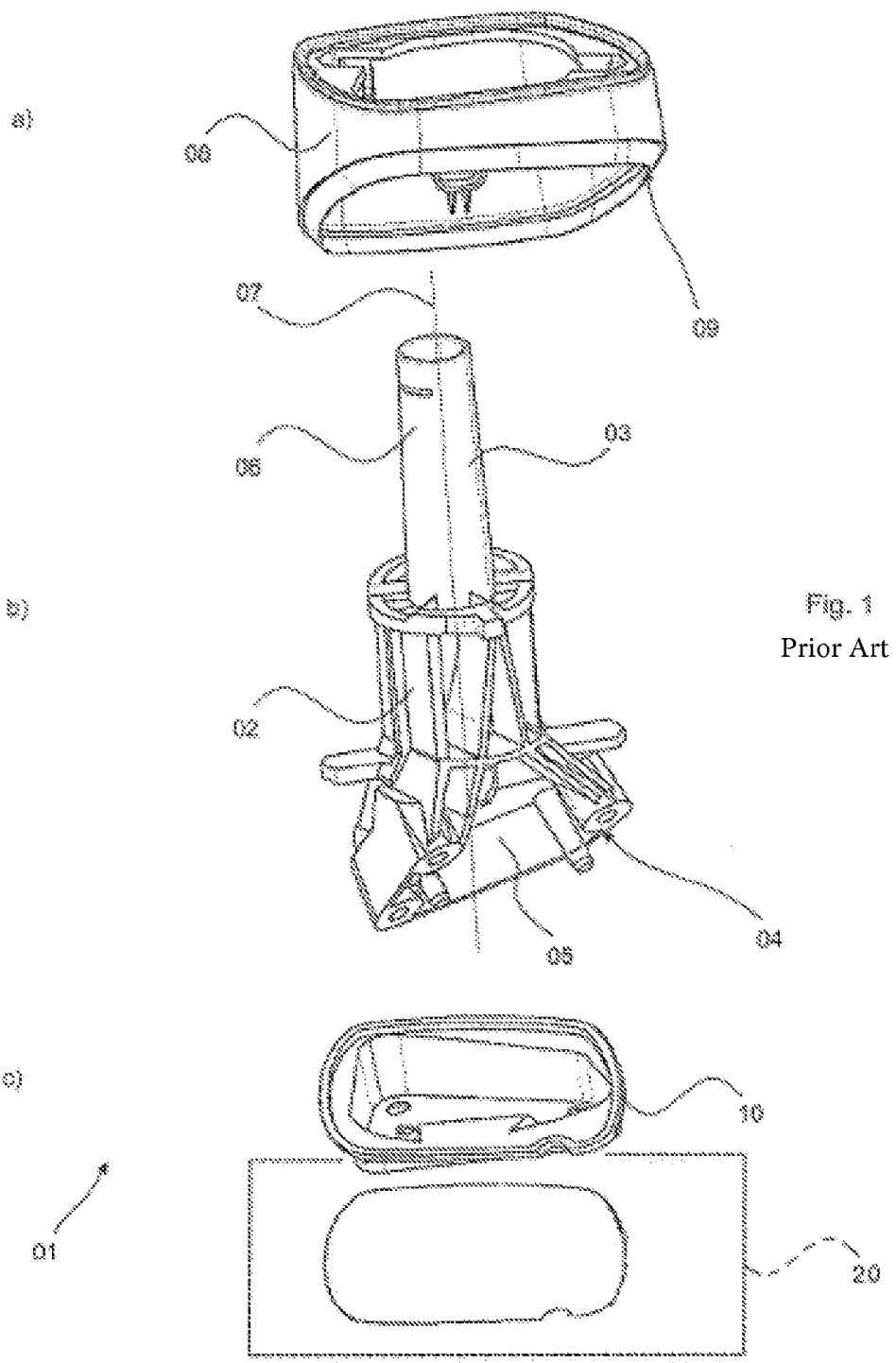
FIG. 1 shows a perspective view of a mirror base (FIG. 1a), a mirror base cover (FIG. 1b) and a seal (FIG. 1c), which covers a surface of the mirror base and the mirror base cover taking its bearing on the vehicle body side, according to the prior art.
Figure 2:
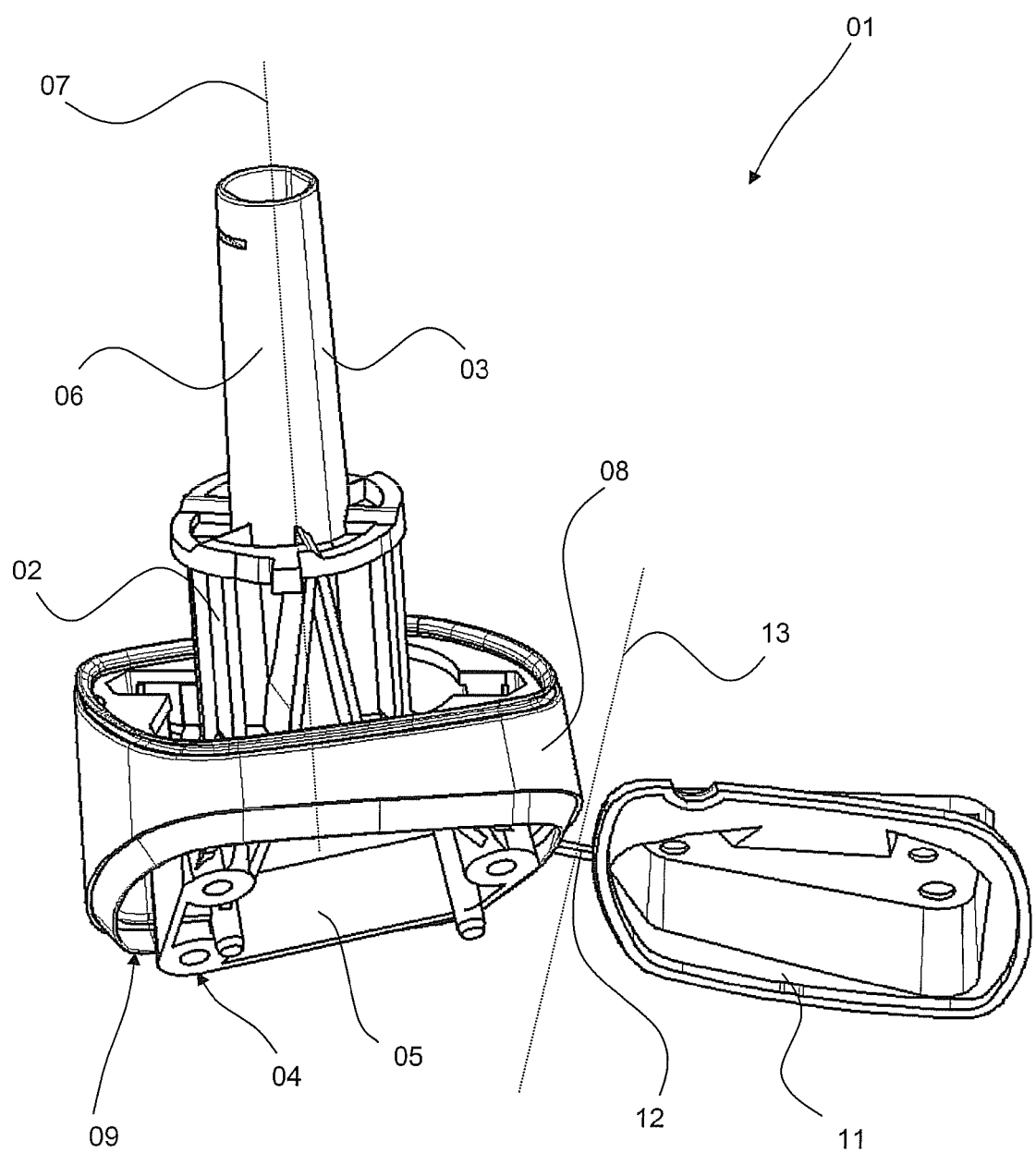
FIG. 2 shows a perspective view of a seal, which is securely connected to the mirror base cover, the seal covering at least a section of at least one surface, taking its bearing on the vehicle side, of a mirror base and a mirror base cover, in a first unassembled state of the exterior rear view mirror, when folded apart, before it is mounted on the motor vehicle on the bodywork side with the mirror base covered by the mirror base cover.
Figure 3:
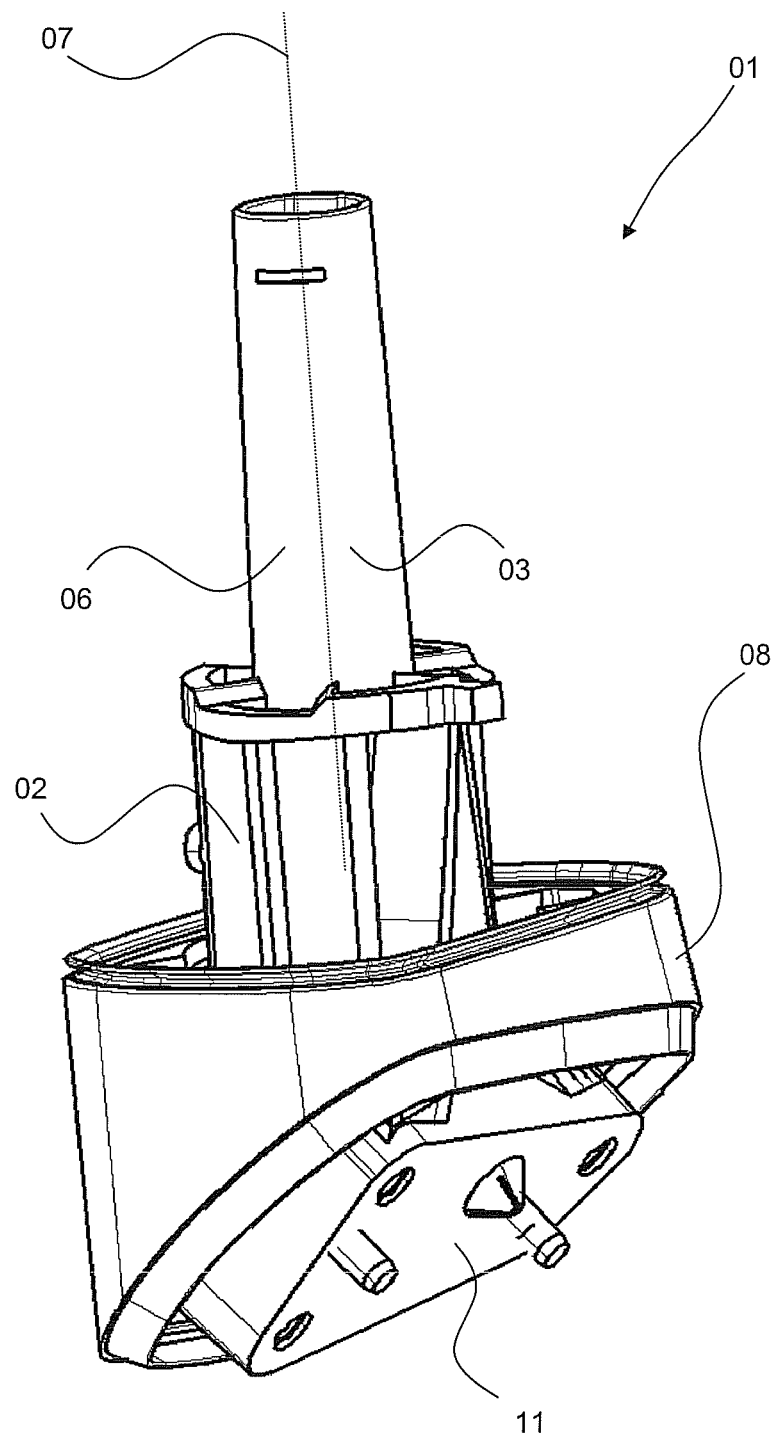
FIG. 3 shows a perspective view of the seal from FIG. 2 in a folded-down, second state of the exterior rear view mirror, before it is mounted on the motor vehicle on the bodywork side with the mirror base covered by the mirror base cover.

A part 01 of an exterior rear view mirror assembly, shown in FIGS. 1 to 3, to be mounted on a body part of a motor vehicle, includes a mirror base 02 with an element 03 on the mirror base side of an articulated connection between the mirror base 02 and a base bracket, housed for example in an exterior rear view mirror housing of an exterior rear view mirror of the exterior rear view mirror assembly, as well as a surface 04, which takes its bearing on the bodywork side, in the case of intended mounting on the body part of the motor vehicle. Recesses 05 can be provided in the surface 04, for example, for saving of material and therefore saving of weight. The element 03 on the mirror base side of the articulated connection concerns, for example, a pin 06 in the form of a truncated cone. The axis of the truncated cone shaped pin 06 here forms a hinge axis 07 of the articulated connection. The exterior rear view mirror can be pivoted about a hinge axis 07 from an operating position to a folding point and vice versa.

The mirror base 02 is at least partly covered by means of a mirror base cover 08. Also in the case of intended mounting on the body part of the motor vehicle, the mirror base can comprise a surface 09 taking its bearing on the bodywork side.

It is intended to seal at least the mirror base 02 against the body part during mounting the exterior rear view mirror assembly or the part 01 of the exterior rear view mirror assembly onto a body part of a motor vehicle, This can take place with simultaneous sealing of a feed-through opening provided in the body part for a cable harness, stemming from the mirror base 02, of the exterior rear view mirror assembly.

For this purpose, a seal 10 is provided, which covers at least one section of at least one surface 04 of a mirror base 02 taking its bearing on the bodywork side, and/or the surface 09 of the mirror base cover 08 taking its bearing on the bodywork side. In the process, before the arrangement on the body part of the part 01 of the exterior rear view mirror assembly to be mounted on the body part, the seal 10 is for example put over the section, which is at least to be covered, of the at least one surface 04, 09, or placed on this. Other procedures are also possible for arranging the seal 10 on the section, which is at least to be covered, of the at least one surface 04, 09.

In the prior art shown in FIG. 1, there is the risk that the seal 10, which is made of an elastic, for example, rubbery, material or material mix, which is foamed if appropriate, can be upended in demoulding or in handling, for example, necessarily or unintentionally, as the case may be. If this is not noticed when covering the surface 04 and/or the surface 09 before installation of the part 01 on the body part, this can lead to a faulty sealing relative to the body part. An exemplary reason for this fault is that in the openings provided in the seal, for example, for a cable harness or for bolted connections etc. provided for connection with the body part, for example, are not arranged symmetrically in most exterior rear view mirror assemblies, but rather are offset, for example, on one side, e.g. to a central point. This can lead to similar, but not identical appearance in an upended state, whereby the described fault in the sealing can occur.

Additionally, in the prior art shown in FIG. 1, there is the risk that the seal 10 can be mounted with an incorrect twist about the hinge axis 07, which also results in a faulty sealing.

In addition, the seal 10 can be simply forgotten or can be lost, unnoticedly, before or during the installation of the part 01 on the body part. This can also result in a faulty sealing.

Inter alia, in order to avoid a faulty sealing, it is intended, as shown in FIGS. 2 and 3, to securely connect a seal 11, which is provided for covering at least one section of at least one surface 04, 09 of the mirror base 02 and/or the mirror base cover 08, lying on the bodywork side 20, to the mirror base 02 and/or the mirror base cover 08 by means of at least one connecting link 12.

The at least one connecting link 12 forms a hinge-like articulated connection to at least one hinge joint axis 13 running adjacently to the surface 04, 09, which takes its bearing on the bodywork side. The seal 11 can be folded about the at least one hinge-joint axis 13 onto the section, which is at least to be covered, of the at least one surface 04, 09, which takes its bearing on the bodywork side.

As shown in FIG. 2, the at least one hinge-joint axis 13 can run outside of the at least one surface 04, 09, which takes its bearing on the bodywork side.

The seal 11 is preferably foldable in the correct location and the exact position about the at least one hinge joint axis 13 onto the section, which is at least to be covered, of the at least one surface 04, 09, which takes its bearing on the bodywork side. The disadvantages of faulty sealings which occur in the prior art, are effectively avoided through this, since:

the seal 11, which is connected to the mirror base 02 and/or the mirror base cover 08 by means of the connecting link 12, cannot be simply forgotten or lost, unnoticedly, before or during the installation of the part 01 on the body part.

the at least one connecting link 12 forms a setting jig which, during folding about the at least one hinge-joint axis 13, gives the correct side, with which the seal 11 comes to lie on the section, which is at least to be covered, of the at least one surface 04, 09, which takes its bearing on the bodywork side.

the at least one connecting link 12 forms a setting jig, which gives the correctly twisted position about the hinge axis 07 during folding about the at least one hinge-joint axis 13.

Additionally, the at least one connecting link 12 can be designed so that it forms a defined hinge-joint axis 13 in its position and orientation relative to the surface 04, 09, which takes its bearing on the bodywork side.

In the process, the seal 11 is preferably securely arranged on the mirror base cover 08 by means of a connecting link 12. In the process, particularly preferably, the seal 11, the at least one connecting link 12 and the mirror base cover 08 are formed as one piece. This is possible, for example, by means of production of an integral seal 11, connecting link 12 and mirror base cover 08 in a two-component or multi-component injection moulding process. Here, the mirror base cover can be made of a firm material or material mix, the connecting link can be made of an elastic material or material mix, and the seal can also be made of an elastic material or material mix, which is foamed if necessary.

The invention is particularly commercially applicable in the production of exterior rear view mirror assemblies for motor vehicles.

LIST OF REFERENCE CHARACTERS

01 Part of an exterior rear view mirror assembly
02 Mirror base
03 Element of an articulated connection
04 Surface of the mirror base, which takes its bearing on the bodywork side
05 Recess
06 Pin
07 Hinge axis
08 Mirror base cover
09 Surface of the mirror base cover, which takes its bearing on the bodywork side
10 Seal
11 Seal
12 Connecting link
13 Hinge-joint axis

The invention claimed is:

1. An exterior rear view mirror assembly for attachment to a vehicle body of a motor vehicle, said exterior rear view mirror assembly comprising:

a mirror base and/or a mirror base cover defining a surface having a defined periphery, which surface takes its bearing on the vehicle body;

a seal covering a section of said surface between said surface and the vehicle body such that said seal seals the vehicle body with respect to said surface; and a connecting link extending between said seal and said mirror base cover, whereby said connecting link of unitary construction forms a hinge-like articulated connection between said seal and said mirror base cover at a location less than all of said periphery of said surface, wherein said connecting link defines a hinge joint axis spaced apart from and disposed away from said surface such that all of said seal pivots about said hinge joint axis, and whereby said seal is pivoted about the hinge joint axis onto said section, which is to be covered and sealed by said seal.

2. The exterior rear view mirror assembly according to claim 1, wherein
the seal is securely arranged on the mirror base by the connecting link.

3. The exterior rear view mirror assembly according to claim 1, wherein
said connecting link is folded about said hinge joint axis, in a correct location and an exact position, such that said seal is positioned onto the section, which is to be covered by the seal, which takes its bearing on the vehicle body.

4. The exterior rear view mirror assembly according to claim 1, wherein
the connecting link does not protrude over the surface of the mirror base and/or mirror base cover when the seal is folded onto the section.

5. The exterior rear view mirror assembly according to claim 1, wherein
the connecting link forms a group of hinge joint axes with differing positions and/or orientations relative to the surface, which takes its bearing on the vehicle body.

6. The exterior rear view mirror assembly according to claim 1, wherein
the connecting link is integrally molded on the seal.

7. The exterior rear view mirror assembly according to claim 1, wherein
the seal, the connecting link and the mirror base cover are formed as one piece using a two-component or multi-component injection molding process.

8. The exterior rear view mirror assembly according to claim 1, wherein
the seal and the connecting link consist of an elastically malleable material or material mix.

9. The exterior rear view mirror assembly according to claim 8, wherein
the material or material mix is foamed, at least in a region of the seal.

10. An exterior rear view mirror assembly for attachment to a vehicle body of a motor vehicle, said exterior rear view mirror assembly comprising:

a mirror base and/or a mirror base cover defining a surface having a defined periphery, which surface takes its bearing on the vehicle body;

a seal covering a section of said surface between said surface and the vehicle body such that said seal seals the vehicle body with respect to said surface; and a connecting link extending between said seal and said mirror base cover, whereby said connecting link forms a hinge-like articulated connection between said seal and said mirror base cover at a location less than all of said periphery of said surface, wherein said connecting link defines a hinge joint axis spaced apart from and disposed away from said said surface such that all of said seal pivots about said hinge joint axis, and whereby said seal is pivoted about the hinge joint axis onto said section, which is to be covered and sealed by said seal, wherein said seal is securely arranged on said mirror base cover by said connecting link, and said seal, said connecting link and said mirror base cover are formed as one piece.

* * * * *